(12) United States Patent
Okada et al.

(10) Patent No.: US 8,941,036 B2
(45) Date of Patent: Jan. 27, 2015

(54) HEATING UNIT, TIRE HEATING APPARATUS, AND METHOD FOR REMODELING TIRE MOLD

(75) Inventors: Kazuto Okada, Kobe (JP); Hideaki Kuwabara, Kobe (JP); Hisashi Mitamura, Takasago (JP); Tomomichi Murata, Takasago (JP); Masatake Toshima, Kobe (JP); Yasuhiko Fujieda, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 1566 days.

(21) Appl. No.: 12/309,022

(22) PCT Filed: Sep. 21, 2007

(86) PCT No.: PCT/JP2007/068448
§ 371 (c)(1),
(2), (4) Date: Jan. 2, 2009

(87) PCT Pub. No.: WO2008/035783
PCT Pub. Date: Mar. 27, 2008

(65) Prior Publication Data
US 2009/0308861 A1 Dec. 17, 2009

(30) Foreign Application Priority Data
Sep. 21, 2006 (JP) .................................. 2006-255215

(51) Int. Cl.
*H05B 6/00* (2006.01)
*B29C 35/00* (2006.01)
(Continued)

(52) U.S. Cl.
CPC .............. *B29C 33/06* (2013.01); *B29C 35/0805* (2013.01); *B29D 30/0601* (2013.01);
(Continued)

(58) Field of Classification Search
CPC .............. B29C 2035/0811; B29C 2035/0816; B29C 33/06; B29C 35/0805; B29D 2030/0674; B29D 2030/0677; B29D 30/0601; B29D 30/0605; B29L 2030/00

USPC .......... 219/618, 200, 635, 672, 770, 777, 745, 219/756, 762; 425/40, 41, 42, 46, 50, 425/174.4; 336/45, 57–62, 65, 73, 75, 77, 336/82, 84 R, 84 C, 84 M, 160, 170, 199
See application file for complete search history.

(56) References Cited

U.S. PATENT DOCUMENTS 1,566,500 A * 12/1925 Northrup ....................... 264/403
2,451,992 A 10/1948 Grotenhuis
(Continued)

FOREIGN PATENT DOCUMENTS

GB        889 516 A      2/1962
JP        63-078720      4/1988
(Continued)

OTHER PUBLICATIONS

JP2001158020A_machine_translation.pdf.*
(Continued)

*Primary Examiner* — Dana Ross
*Assistant Examiner* — Ket D Dang
(74) *Attorney, Agent, or Firm* — Studebaker & Brackett PC

(57) ABSTRACT

The present invention provides a heating unit capable of easily and inexpensively adjusting total impedance based on tire mold size so that a power source can be used at a high power factor, and a tire heating apparatus using the same. A ferromagnetic metallic member 10*a* heats a tire mold M1 by heat conduction. An induction heating coil C1 is disposed on the side of the ferromagnetic metallic member 10*a* opposite the tire mold M1 to induction-heat the ferromagnetic metallic member 10*a* by generating magnetic field lines. A nonmagnetic conductor 30*a* is disposed on the side of the induction heating coil C1 opposite the ferromagnetic metallic member 10*a* to shield the magnetic field lines generated by the induction heating coil C1. A heating unit 100*a* including these elements heats the tire mold M1 storing a tire. A relative positional relationship among the nonmagnetic conductor 30*a*, the induction heating coil C1 and the ferromagnetic metallic member 10*a* is set by first spacers 71*a* and 72*a* and second spacers 21*a* to 23*a*.

12 Claims, 13 Drawing Sheets

(51) Int. Cl.
  *H01F 21/02* (2006.01)
  *B29C 33/06* (2006.01)
  *B29C 35/08* (2006.01)
  *B29D 30/06* (2006.01)
  *B29L 30/00* (2006.01)

(52) U.S. Cl.
  CPC ..... *B29D30/0605* (2013.01); *B29C 2035/0811* (2013.01); *B29C 2035/0816* (2013.01); *B29D 2030/0674* (2013.01); *B29D 2030/0677* (2013.01); *B29L 2030/00* (2013.01)
  USPC .......... 219/618; 219/200; 219/635; 219/672; 219/770; 219/777; 425/40; 425/41; 425/42; 425/46; 425/174.4; 336/45; 336/57; 336/65; 336/84 R; 336/160

(56) References Cited

U.S. PATENT DOCUMENTS

| | | | |
|---|---|---|---|
| 3,770,931 A | | 11/1973 | Gilliatt |
| 4,117,295 A | * | 9/1978 | Beach ........................... 219/636 |
| 4,599,061 A | * | 7/1986 | Manabe et al. ................. 425/41 |
| 4,721,590 A | | 1/1988 | Trapp |
| 4,788,394 A | * | 11/1988 | Vanneste et al. .............. 219/636 |
| 5,035,591 A | | 7/1991 | Soeda et al. |
| 6,203,306 B1 | * | 3/2001 | Inoue et al. ............ 425/174.8 R |
| 6,474,968 B1 | | 11/2002 | Mitamura et al. |
| 2002/0015747 A1 | | 2/2002 | Mitamura et al. |
| 2003/0183622 A1 | * | 10/2003 | Okada et al. .................. 219/635 |
| 2005/0006380 A1 | * | 1/2005 | Kagan .......................... 219/661 |

FOREIGN PATENT DOCUMENTS

| | | | | |
|---|---|---|---|---|
| JP | 02-155617 | | 12/1988 | |
| JP | 02-155617 | | 6/1990 | |
| JP | 10-180765 | | 12/1996 | |
| JP | 10-180765 | | 7/1998 | |
| JP | 2001-158020 | | 12/1999 | |
| JP | 2001-001342 | | 1/2001 | |
| JP | 2001-079851 | | 3/2001 | |
| JP | 2001-158020 | | 6/2001 | |
| JP | 2001158020 A | * | 6/2001 | .............. B29C 33/02 |
| JP | 2003-080522 | | 3/2003 | |
| RU | 1 776 228 A3 | | 11/1992 | |

OTHER PUBLICATIONS

Notification of Reason(s) for Refusal issued by the Japanese Patent Office on Apr. 12, 2011 in the corresponding Japanese Patent Application No. 2007-243264 (3 pages), with an English language translation (3 pages).

International Search Report of PCT/JP2007/068448 mailed Dec. 25, 2007.

Extended European Search Report Communication issued the European Patent Office on Mar. 8, 2011 in Application No. 07807779.9-2307 / 2065151 PCT/JP2007068448 (13 pages).

* cited by examiner

HEATING UNIT, TIRE HEATING APPARATUS, AND METHOD FOR REMODELING TIRE MOLD

FIELD OF THE INVENTION

The present invention relates to a heating unit for heating a tire mold, a tire heating apparatus using the same, and further a method for remodeling a tire mold.

BACKGROUND OF THE INVENTION

Vulcanization molding of a green tire involves heating of the green tire. This heating is carried out, for example, by generating steam in a main boiler, supplying the heat of the steam into a steam flow passage within a tire mold containing the green tire through a steam pipe disposed in contact with the tire mold to heat the tire mold, and further transferring the heat of the tire mold to the tire. However, the heating using steam is inferior in heat efficiency since the thermal energy of the steam is lost by radiation from the surface of the steam pipe extending from the main boiler to the tire mold. Therefore, a technique for minimizing the loss of thermal energy is disclosed in Patent Reference 1, in which a metallic ring member contacting with a tire mold is induction-heated by applying alternate current to an induction heating coil installed within the ring member, and the tire mold is heated through the heated ring member. According to this technique, rapid heating (boost heating) of the tire mold can be performed due to minimized thermal energy loss, and the tire mold and the green tire can be efficiently heated, compared with the steam heating.
Patent Literature 1: Japanese Patent Laid-Open No. 2001-158020

DISCLOSURE OF THE INVENTION

Problem to be Solved by the Invention

In application of the technique of Patent Literature 1 using a power source for supplying a predetermined power, to use the power source with high power factor, it is needed to appropriately set a capacitor capacitance in a resonance circuit based on the power source and appropriately match the total impedance of the induction heating coil and the metallic member to be heated to a movable impedance range of the power source. The adjustment of total impedance is generally performed by, as well as changing the distance between the induction heating coil and the metal to be heated or changing the turns of the coil, adjusting the ratio of voltage and current to be applied to the induction heating oil by use of a matching transformer.

However, when the adjustment of total impedance as described above is performed in accordance with various kinds of tire mold sizes, it is difficult, from the viewpoint of the conventional structure, to change the distance between the induction heating coil and the metal to be heated. To change the turns of the induction heating coil requires an increased cost and operations attended with difficulty, since it involves repeated trial and error processes. Further, setting of the matching transformer leads to an increase in facility cost.

Thus, the present invention has an object to provide a heating unit, capable of easily adjusting total impedance based on tire mold size at low cost so that a power source can be used with high power factor, and a tire heating apparatus using the same.

The present invention has the other object to provide a tire heating apparatus and a method for remolding a tire mold, capable of performing efficient heating of a tire even if a tire mold for steam heating having an annular hole used as a steam flow passage is diverted and heated by a method other than steam heating.

Means to Solve the Problem

To attain the above-mentioned objects, a heating unit for heating a tire mold containing a tire according to the present invention comprises a ferromagnetic metallic member for heating the tire mold by heat conduction; an induction heating coil disposed on the side of the ferromagnetic metallic member opposite the tire mold, which induction-heats the ferromagnetic metallic member by generating magnetic field lines; a nonmagnetic conductor disposed on the side of the induction heating coil opposite the ferromagnetic metallic member, which shields the magnetic field lines generated by the induction heating coil; and positioning means for setting a relative positional relationship among the nonmagnetic conductor, the induction heating coil and the ferromagnetic metallic member.

According to this structure, since the relative positional relationship among the nonmagnetic conductor, the induction heating coil, and the ferromagnetic metallic member can be set by adjusting the positioning means, the total impedance of the heating unit can be easily adjusted based on tire mold size at low cost so that a power source can be used with high power factor. Since the nonmagnetic conductor functions as magnetic shield, the direction of magnetic field lines of the induction heating coil can be regulated to the direction of induction-heating the ferromagnetic metallic member to efficiently heat the tire mold and a tire held therein. The nonmagnetic conductor means a conductor which is low in magnetic permeability, compared with the ferromagnetic metallic member, and has relative magnetic permeability of about 1.

The heating unit may include, as the positioning means, a first spacer for setting a distance between the nonmagnetic conductor and the induction heating coil. According to this, the adjustment of total impedance of the heating unit can be performed by adjusting the magnetic shield.

The heating unit may include, as the positioning means, a second spacer for setting a distance between the ferromagnetic metallic member and the induction heating coil. According to this, the adjustment of total impedance of the heating unit can be performed by adjusting the heating state of the ferromagnetic metallic member.

The heating unit may further include a heat insulating member provided between the induction heating coil and the ferromagnetic metallic member. According to this, deterioration of the induction heating coil resulting from exposure to a high-temperature environment can be prevented to continuously perform rapid heating. Further, outside release of heat can be prevented to improve the heating efficiency of the tire mold and the tire.

The heating unit may further include a ferromagnetic nonconductive member provided between the nonmagnetic conductor and the induction heating coil. According to this, the direction of magnetic field lines of the induction heating coil can be regulated to the direction of induction-heating ferromagnetic metallic member to enhance the efficiency of heating the tire mold and the tire. The ferromagnetic nonconductive member means a ferromagnetic member which hardly conducts electricity, compared with the ferromagnetic metallic member. As the ferromagnetic nonconductive member, iron oxide (ferrite core) or the like is used.

The nonmagnetic conductor may be aluminum. According to this, the magnetic shield function of the nonmagnetic conductor can be ensured to surely regulate the direction of magnetic field lines of the induction heating coil, so that the tire mold and the tire can be efficiently heated. Further, even if eddy current is induced, the nonmagnetic conductor hardly causes heating because of high conductivity, and power consumption in the nonmagnetic conductor is minimized.

The ferromagnetic metallic member may be a steel-made member having magnetic permeability of 100 to 1000. According to this, the tire mold and the tire can be further efficiently heated since the ferromagnetic metallic member is more easily induction-heated.

A tire heating apparatus according to the present invention comprises a tire mold for holding a tire, and two sets of above-mentioned heating unit, which are disposed vertically opposite each other across the tire mold, so that the two heating units heat the tire mold from both the upper side and lower side thereof. According to this, the tire mold and the tire can be efficiently heated using the above-mentioned heating unit by heating the tire mold from both the upper side and lower side thereof.

The tire heating apparatus of the prevent invention otherwise comprises the above-mentioned heating unit, and a tire mold composed of a plurality of split segments and having an internally formed annular hole, the annular hole being filled with a filling material having high thermal diffusivity. According to this, when a mold internally having an annular hole formed to encapsulate heating steam, for example, is diverted, heat can be rapidly diffused in the tire mold, compared with the case in which the annular hole is filled with air, and the heating efficiency of tire is thus improved.

As the filling material having high thermal diffusivity, for example, heat medium oil, silicone oil, liquid metal (gallium, Wood's metal), pressurized water or the like is used. Further, these materials may include solid particles of metal such as aluminum, copper, or iron.

To attain the other object, a tire heating apparatus according to the present invention comprises a tire mold internally having an annular hole formed to encapsulate heating steam, and a heating mechanism for heating the tire mold by heat conduction, in which the annular hole is filled with a filling material having high thermal diffusivity, and the tire mold is heated by the heating mechanism.

When a tire mold for steam heating is diverted and heated by a method other than steam heating, for example, by a method adapted to induction-heat a metal to be heated by an induction heating coil, an annular hole of the tire mold which is used as a steam flow passage becomes a factor for inhibiting improvement in heating efficiency, if the annular hole is left as it is or is filled with air, since thermal diffusion is inhibited by the annular hole part of the tire mold. Therefore, by adapting the structure as described above, heat can be rapidly diffused within the tire mold to efficiently heat the tire, compared with the case in which the annular hole is filled with air.

To attain the other object, a method for remodeling a tire mold internally having an annular hole formed to encapsulate heating steam according to the present invention comprises the steps of filling the annular hole with a filling material having high thermal diffusivity, installing a heating mechanism for heating the tire mold by heat conduction, and heating the tire mold by the heating mechanism. When a tire mold for steam heating is diverted by remodeling the tire mold by this method, rapid diffusion of heat within the tire mold can be attained to efficiently heat the tire, compared with in the case in which the annular hole is filled with air.

Figure 1:
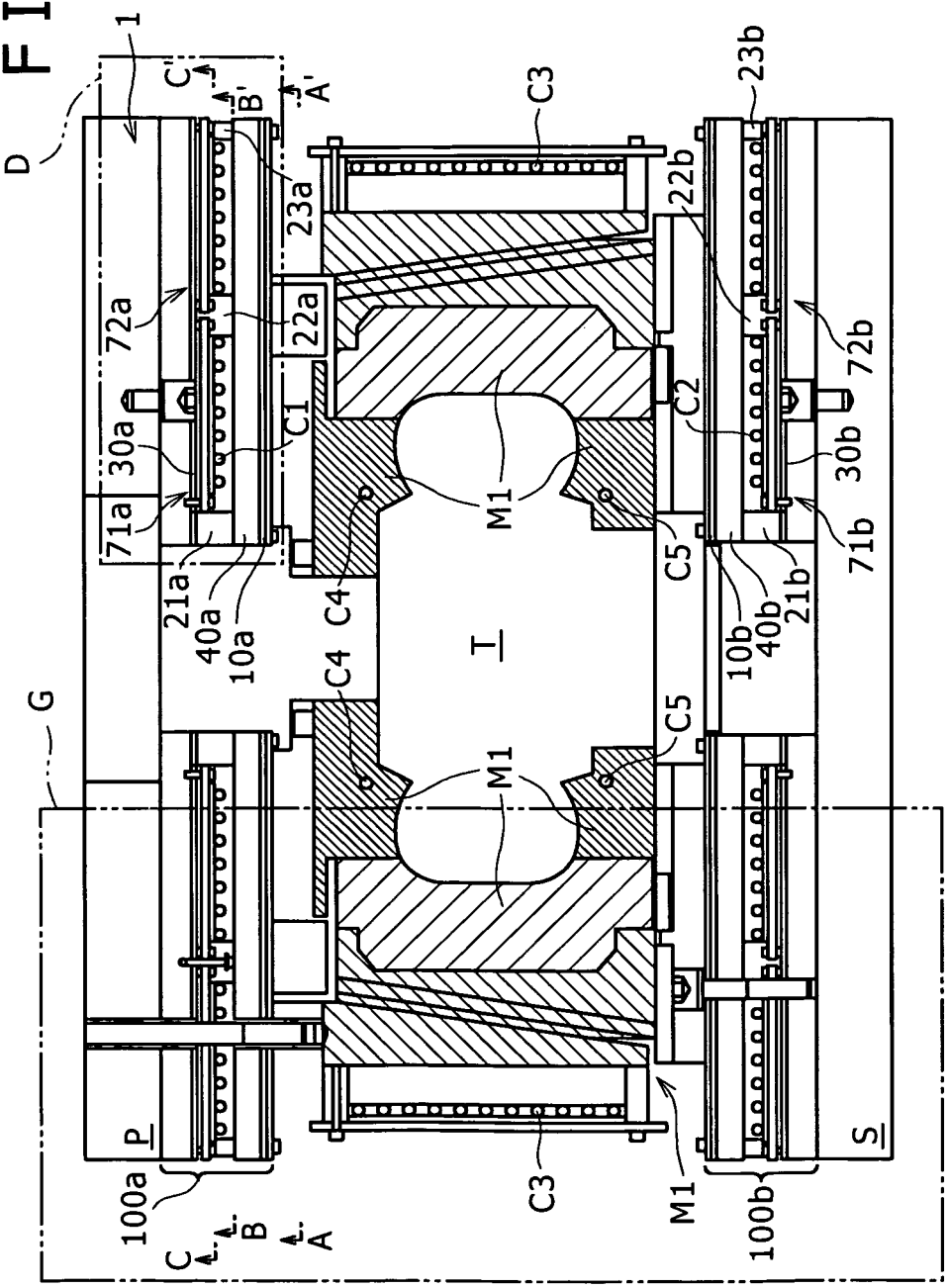
FIG. 1 is a schematic side sectional view of a tire heating apparatus according to a first embodiment of the present invention.

DESCRIPTION OF NUMERICAL REFERENCES 1, 4, 5: Tire heating apparatus
100a, 100b, 200a, 300a: Heating unit (heating mechanism)
10a, 10b: Ferromagnetic metallic member
71a, 72a, 71b, 72b, 371a-373a: First spacer
21a-23a, 21b-23b, 321a-323a: Second spacer
30a, 30b: Nonmagnetic conductor
40a, 40b, 81, 240a-243a: Heat insulating member
51a, 52a, 51b, 52b, 90: Ferromagnetic nonconductive member
80: Nonmetallic member or nonmagnetic metallic member
82: Nonmagnetic metallic member
85: Heat shield
C1, C2, C3, C4, C5, C6, C7: Induction heating coil
M1, M2, M3: Tire mold
h1, h2: Annular hole Best Mode For Carrying Out The Invention Hereinafter, preferred embodiments of the present invention will be described in reference to the drawings.

[First Embodiment]

The entire structure of a tire heating apparatus according to the first embodiment will be described in reference to FIG. 1. FIG. 1 is a schematic side sectional view of the tire heating apparatus according to this embodiment, which shows the entire structure of this embodiment. In FIG. 1, although the mold part is shown by diagonal lines showing a section thereof, diagonal lines are omitted for the heating unit part since the detail thereof is shown in the enlarged view of FIG. 3. In this embodiment, the heating unit of the prevent invention is used as a part of a heating apparatus of a tire vulcanizer.

A tire heating apparatus 1 comprises, as shown in FIG. 1, a tire mold M1, two heating units 100a and 100b disposed vertically opposite each other to hold the tire mold M1 from both the upper side and lower side thereof, an upper platen support P located at the top of the upper heating unit 100a, and a lower platen support S as a base part located at the bottom of the lower heating unit 100b. In the thus-constituted tire heating apparatus 1, ferromagnetic metallic members 10a and 10b within the heating units 100a and 100b are heated by induction heating of induction heating coils C1 and C2 of the heating units 100a and 100b, with a tire (not shown) being stored in a tire storage part T of the tire mold M1. The thermal energy generated therein is transferred by heat conduction through the tire mold M1, whereby the tire is heated from the outer surface side.

An induction heating coil C3 is disposed to surround the side surface of the tire mold M1, and induction heating coils C4 and C5 are disposed in the inner part of the tire mold M1 so as to sandwich the tire storage part T from both the upper side and lower side thereof. The induction heating coil C3 performs heating from the outer surface side of the tire by induction-heating the tire mold as described later. The induction heating coils C4 and C5 perform heating from the inside of the tire by induction-heating metallic members disposed within upper and lower bead parts (tire hole peripheral parts) of the tire. Further, a pipe for passing a high-temperature, high-pressure pressurized medium is formed so as to connect with the inner part of the tire storage part T, and heating is performed from the inner surface side of the tire by feeding the pressurized medium into the tire.

The structure of the tire mold M1 will be then described. As shown in FIG. 1, the tire mold M1 is composed of a plurality of split segments of nonmagnetic members, and includes the tire storage part T that is a space for storing a tire to be heated inside thereof. A hydraulic cylinder mechanism not shown is installed above the upper platen support P, so that the tire mold M1 can be opened to carry the tire in and out of the tire storage part T by controlling the hydraulic cylinder mechanism. Similarly, the tire mold M1 composed of split segments can be closed by controlling the hydraulic cylinder mechanism to press the upper platen support P downward.

Figure 2:
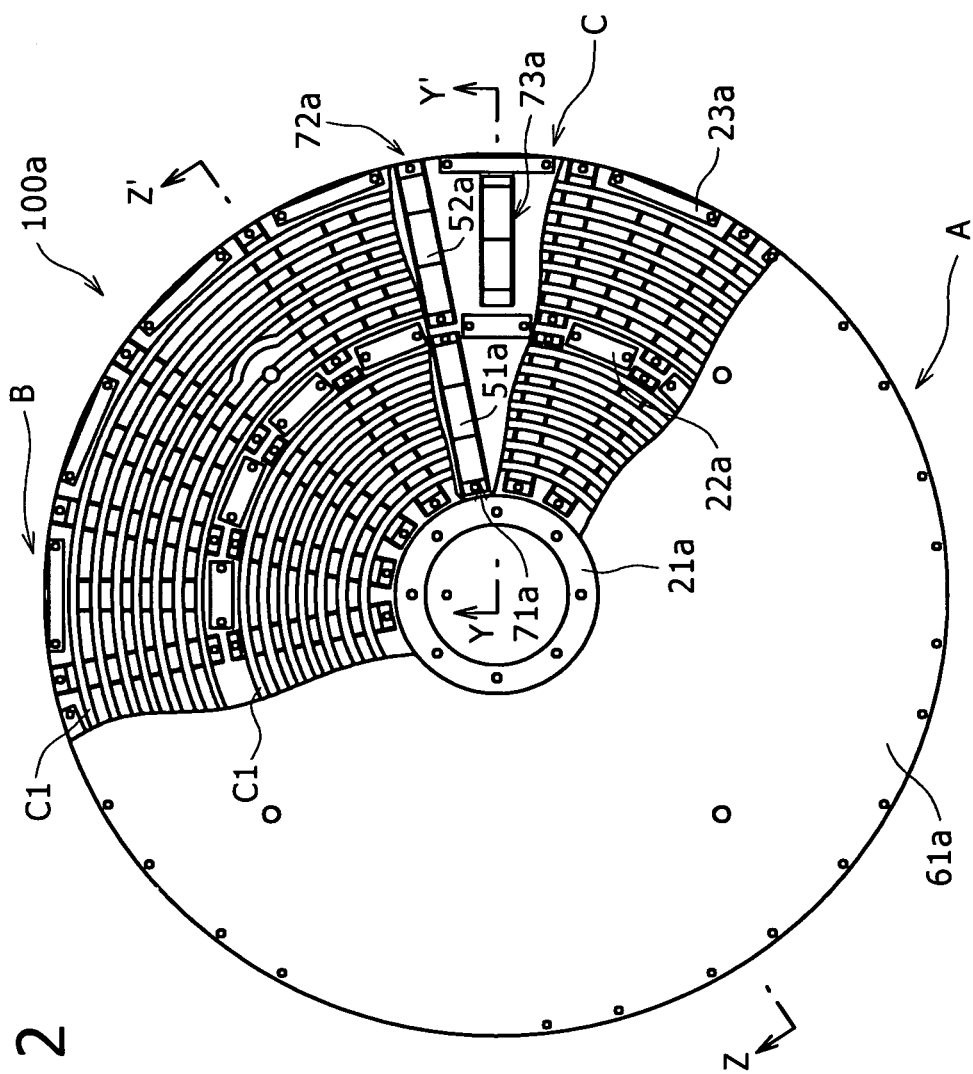
FIG. 2 is a schematic sectional view of the tire heating apparatus, which is partially cutaway along the lines A-A', B-B' and C-C' of FIG. 1.

The heating unit according to the present invention will be then described in detail in reference to FIGS. 1 and 2. As shown in FIG. 1, each of the heating units 100a and 110b comprises a ferromagnetic metallic member 10a, 10b, an induction heating coil C1, C2 disposed outside the ferromagnetic metallic member 10a, 10b vertically around the tire mold M1, and a nonmagnetic conductor 30a, 30b disposed further outside the induction heating coil C1, C2. Each of the heating units 100a, 100b further includes spacers (positioning means) for setting a relative positional relationship among the nonmagnetic conductor 30a, 30b, the induction heating coil C1, C2, and the ferromagnetic metallic member 10a, 10b. Concretely, first spacers 71a and 72a, 71b and 72b for setting a distance between the nonmagnetic conductor 30a, 30b and the induction heating coil C1, C2, and second spacers 21a to 23a, 21b to 23b for setting a distance between the ferromagnetic metallic member 10a, 10b and the induction heating coil C1, C2 are provided within each of the heating units 100a and 100b, respectively. The upper heating unit 100a and the lower heating unit 100b are disposed to be substantially vertically symmetric across the tire mold M1 as described above, and these units have substantially the same structure. Therefore, the upper heating unit 100a will be mainly described hereinafter, while omitting the description for the lower heating unit 100b.

FIG. 2 is a schematic sectional view of FIG. 1, wherein areas A, B and C partially show sections taken along the lines A-A', B-B', and C-C' of FIG. 1, respectively. In FIG. 2, the section taken along the line Z-Z' corresponds to the schematic sectional view of FIG. 1.

The heating unit 100a is formed in a circular shape in a plan view from under (hereinafter referred simply to as plan view), as shown in FIG. 2, and the induction heating coil C1 is formed in a spiral shape in this plan view (refer to the area B). The heating unit 100a has a plurality of first spacers 71a and 72a extending in the radial direction of the circle in this plan view, which are radially disposed at equal circumferential intervals. The radially inside, second spacer 21a is formed in a ring shape, and a plurality of second spacers 22a and 23a are disposed at equal circumferential intervals so as not to be overlapped with the plurality of first spacers 71a and 72a in the plane view. The plurality of second spacers 21a to 23a has the same height (length vertical to the plane of paper). A plurality of third spacers 73a is disposed between the plurality of second spacers 22a and 23a. The third spacer 73a can be omitted.

Figure 3:
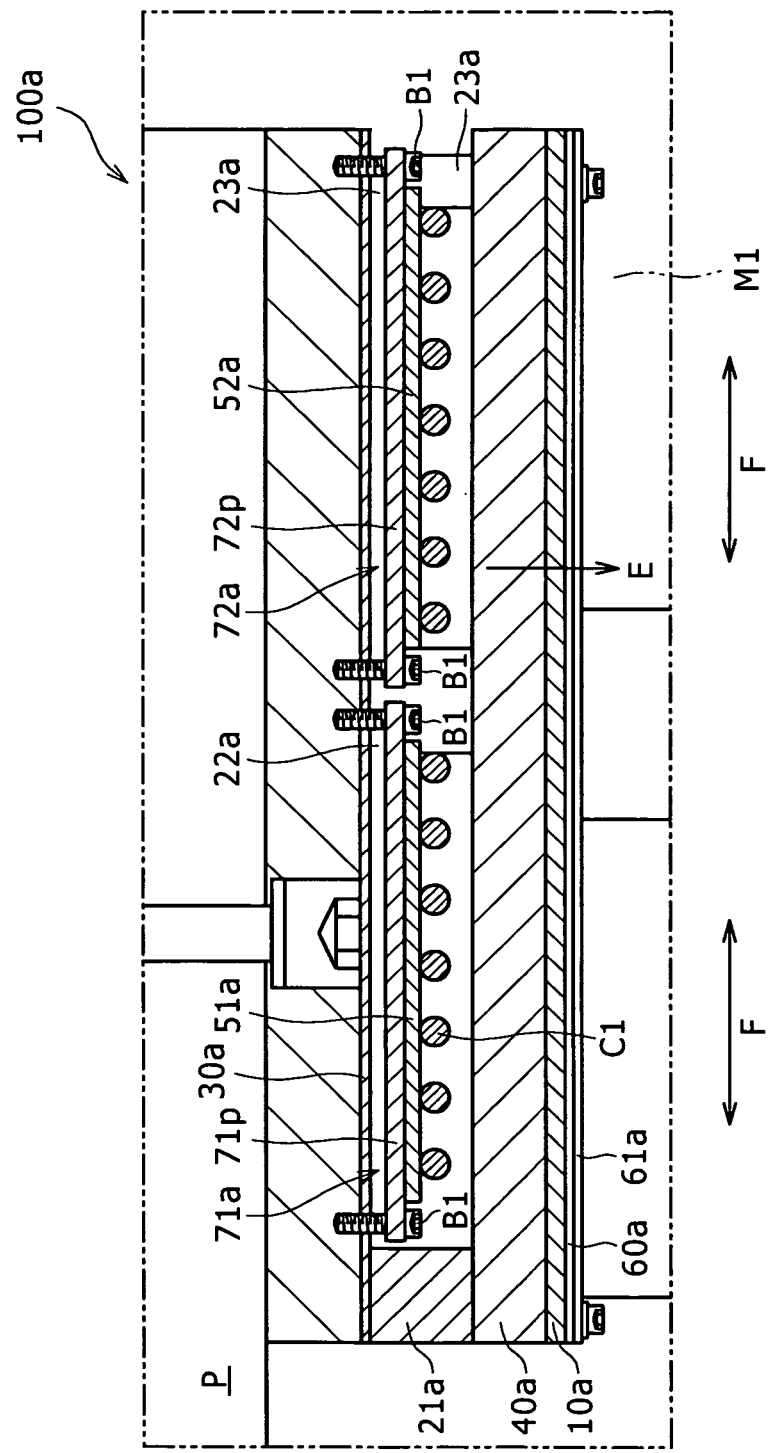
FIG. 3 is an enlarged schematic view of the area D of FIG. 1.

The detail of the heating unit 100a will be described in reference to FIG. 3. FIG. 3 is an enlarged view of the area D of FIG. 1. The induction heating coil C1 generates magnetic field lines in the circumference by receiving power supplied from a power source not shown. The ferromagnetic metallic member 10a is a ferromagnetic steel-made member, which is induction-heated by the magnetic field lines generated by the induction heating coil C1. More specifically, eddy current is generated in the inner part of the heating unit by the effect of the generated magnetic field lines, and heat is generated by the electric resistance of the ferromagnetic metallic member 10a. As the ferromagnetic metallic member 10a, a steel-made member having magnetic permeability of 100 to 1000 is used. According to this, the tire mold M1 and the tire can be heated while efficiently induction-heating the ferromagnetic metallic member 10a.

A graphite sheet 60a having high thermal conductivity is disposed below the ferromagnetic metallic member 10a to be in contact with the ferromagnetic metallic member 10a. A copper plate 61a is disposed further below the graphite sheet 60a so that the copper plate 61a is directly in contact with the tire mold M1. The copper plate 61a also has high thermal conductivity similarly to the graphite sheet 60a. Since the thermal energy generated in the ferromagnetic metallic member 10a is easily transferred radially (in the direction of arrow F of FIG. 3) or circumferentially by disposing the graphite sheet 60a and the copper plate 61a between the ferromagnetic metallic member 10a and the tire mold M1, the temperature distribution in the tire mold M1 can be uniformed.

The magnetic field lines by the induction heating coil C1 are generated not only in the direction of the ferromagnetic metallic member 10a (in the direction of the arrow E of FIG. 3) but also in the upper direction. Since the upper platen support P of the steel-made member is disposed in the upper direction, the upper platen support P is induction-heated, when the magnetic field lines reach it, by the effect of the magnetic field lines similarly to the ferromagnetic metallic member 10a, and the thermal energy of this portion is consumed in the upper platen support P which does not need heating. Therefore, the power of the power source cannot be effectively used. In this embodiment, ferromagnetic nonconductive members 51a and 52a are disposed above the induction heating coil C1. As the ferromagnetic nonconductive members 51a and 52a, iron oxide (ferrite core) or the like is used. The induction heating coil C1 is fixed to the ferromagnetic nonconductive members 51a and 52a. According to this structure, since the ferromagnetic nonconductive members 51a and 52a function as the magnetic shield, and the magnetic field lines generated in the induction heating coil C1 is shielded by the upper ferromagnetic nonconductive members 51a and 52a, the direction of magnetic field lines of the induction heating coil C1 can be regulated to the direction of induction-heating the ferromagnetic metallic member 10a (the direction of the arrow E) to efficiently heat the tire mold M1 and the tire. The ferromagnetic nonconductive members 51a and 52a can be omitted since they are disposed as needed.

The upward magnetic field lines which could not be shielded by the ferromagnetic nonconductive members 51a and 52a are shielded by the nonmagnetic conductor 30a disposed outside the ferromagnetic nonconductive members 51a and 52a. Since the nonmagnetic conductor 30a functions as the magnetic shield, the direction of magnetic field lines of the induction heating coil C1 can be regulated to the direction of induction-heating the ferromagnetic metallic member 10a (the direction of the arrow E) to efficiently heat the tire mold M1 and the tire. In this embodiment, aluminum is used as the nonmagnetic conductor 30a. According to this, since the magnetic shielding function of the nonmagnetic conductor 30a can be ensured to surely regulate the direction of magnetic field lines of the induction heating coil C1, and the tire mold M1 and the tire can be efficiently heated. Even if eddy current is induced in the nonmagnetic conductor 30a, heating is hardly caused since the nonmagnetic conductor 30a has high conductivity (small electric resistance), and the power consumption in the nonmagnetic conductor 30a is minimized. As the nonmagnetic conductor, copper or the like can be used as well as aluminum.

A heat insulating member 40a is disposed between the induction heating coil C1 and the ferromagnetic metallic member 10a. When the technique of the above-mentioned Patent Literature 1 is used, the tire mold must be opened to carry a tire into or out of the tire mold, during which the heat of the tire mold is released out by convection or radiation. Further, the temperature of the tire mold in a contact part with a green tire is reduced since the tire temperature is about room temperature at the start of tire heating. Although the temperature drop of the tire mold can be reduced by adjusting the applied current slightly large, deterioration of the induction heating coil resulting from exposure to a high-temperature environment disables rapid heating of the tire mold. Therefore, by adapting the above-mentioned structure, upward movement of the thermal energy generated in the ferromagnetic metallic member 10a can be limited to prevent the deterioration of the induction heating coil C1, and the rapid heating can be thus continuously performed. Further, the outside release of heat can be prevented to improve the heating efficiency of the tire mold M1 and the tire.

Figure 4:
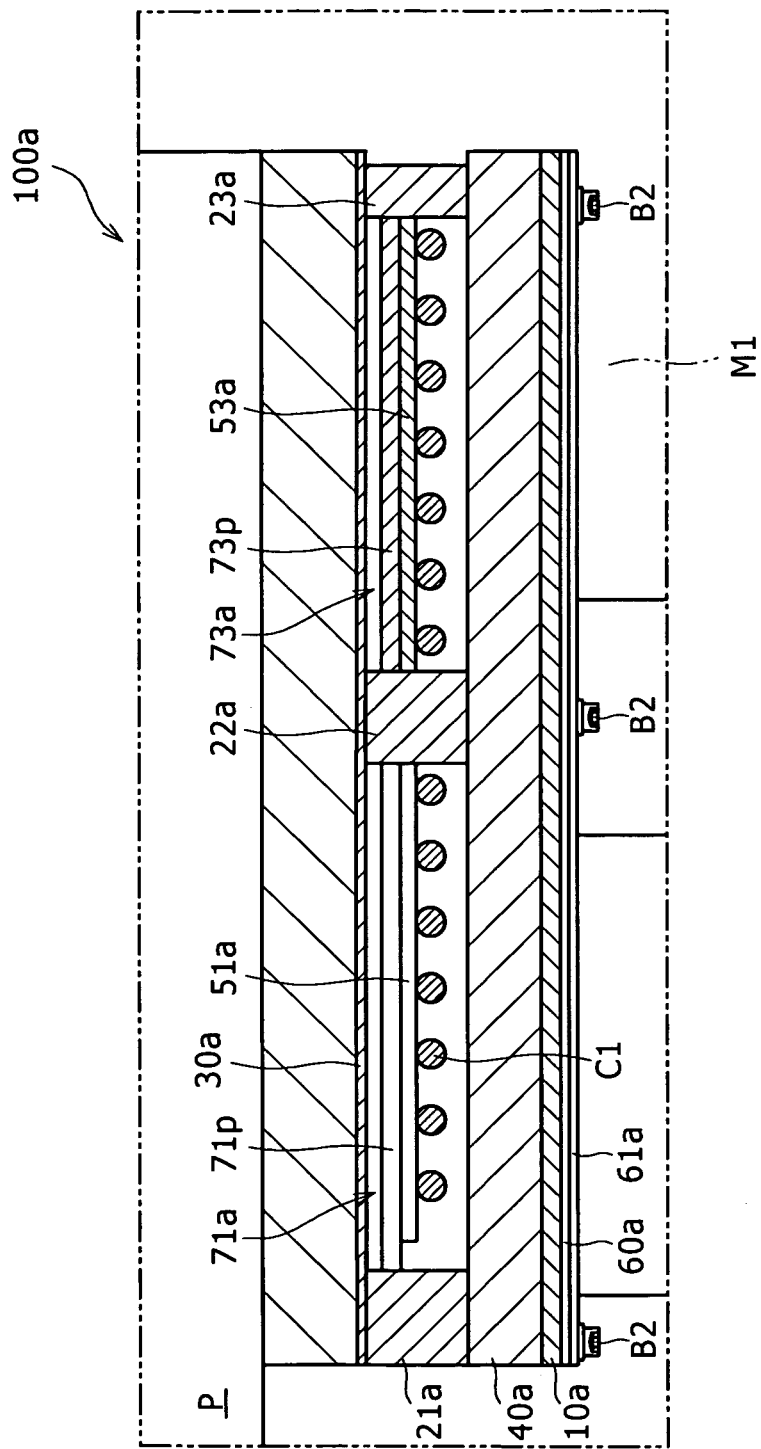
FIG. 4 is an enlarged schematic sectional view taken along the line Y-Y' of FIG. 2.

The structures of the first spacers 71a and 72a and the second spacers 21a to 23a will be then described in reference to FIGS. 3 and 4. Referring to FIG. 3, each of the first spacers 71a and 72a comprises a spacer plate 71p, 72p and spacer bolts B1, respectively, and each first spacer 71a, 72a (the spacer plate 71p, 72p and the spacer bolts B1) is installed by fitting the bolts B1 to fitting holes formed in the nonmagnetic conductor 30a and the upper platen support P through the spacer plate 71p, 72p. The distance between each spacer plate 71p, 72p and the nonmagnetic conductor 30a can be adjusted by adjusting the screwing quantity of the bolts B1 to adjust the length of the bolts B1 to be inserted into the fitting holes of the nonmagnetic conductor 30a and the upper side platen support P. The ferromagnetic nonconductive members 51a and 52a are stationarily disposed on the tire mold M1-side surface of the spacer plates 71p and 72p, respectively, and the induction heating coil C1 is fixed to the ferromagnetic nonconductive members 51a and 52a as described above. As a result, the distance between the nonmagnetic conductor 30a and the induction heating coil C1 can be set by adjusting the screwing quantity of the bolts B1. And the magnetic shield can be consequently adjusted to adjust the total impedance of the heating unit 100a. The third spacer 73a also comprises a spacer plate 73p and bolts not shown similarly to the first spacers 71a and 72a, and is adapted so that the distance between the spacer plate 73p and the nonmagnetic conductor 30a can be adjusted. The distance between each spacer plate 71p, 72p and the nonmagnetic conductor 30a may be adjusted by interposing another spacer member between each spacer plate 71a, 72a and the nonmagnetic conductor 30a.

The second spacers 21a to 23a will be described in reference to FIG. 4. FIG. 4 is an enlarged schematic sectional view taken along the line Y-Y' of FIG. 2. The second spacers 21a to 23a are provided between the nonmagnetic conductor 30a and the heat insulating member 40a as shown in FIG. 4. Each of the second spacers 21a to 23a is disposed to be held between the nonmagnetic conductor 30a and the heat insulating member 40a by fitting a bolt B2 into a fitting hole formed in the nonmagnetic conductor 30a and the upper platen support P through each second spacer 21a to 23a. In this embodiment, the bolt B2 is fitted into the fitting hole of the nonmagnetic conductor 30a and the upper platen support P through the copper plate 61a, the graphite sheet 60a, the ferromagnetic metallic member 10a, the heat insulating member 40a and each second spacer 21a to 23a. The distance between the ferromagnetic metallic member 10a and the induction heating coil C1 can be set by replacing the second spacers 21a to 23a by other spacers having a different height. As a result, the total impedance of the heating unit 100a can be adjusted by adjusting the heating state of the ferromagnetic metallic member 10a by the second spacers 21a to 23a.

Figure 5:
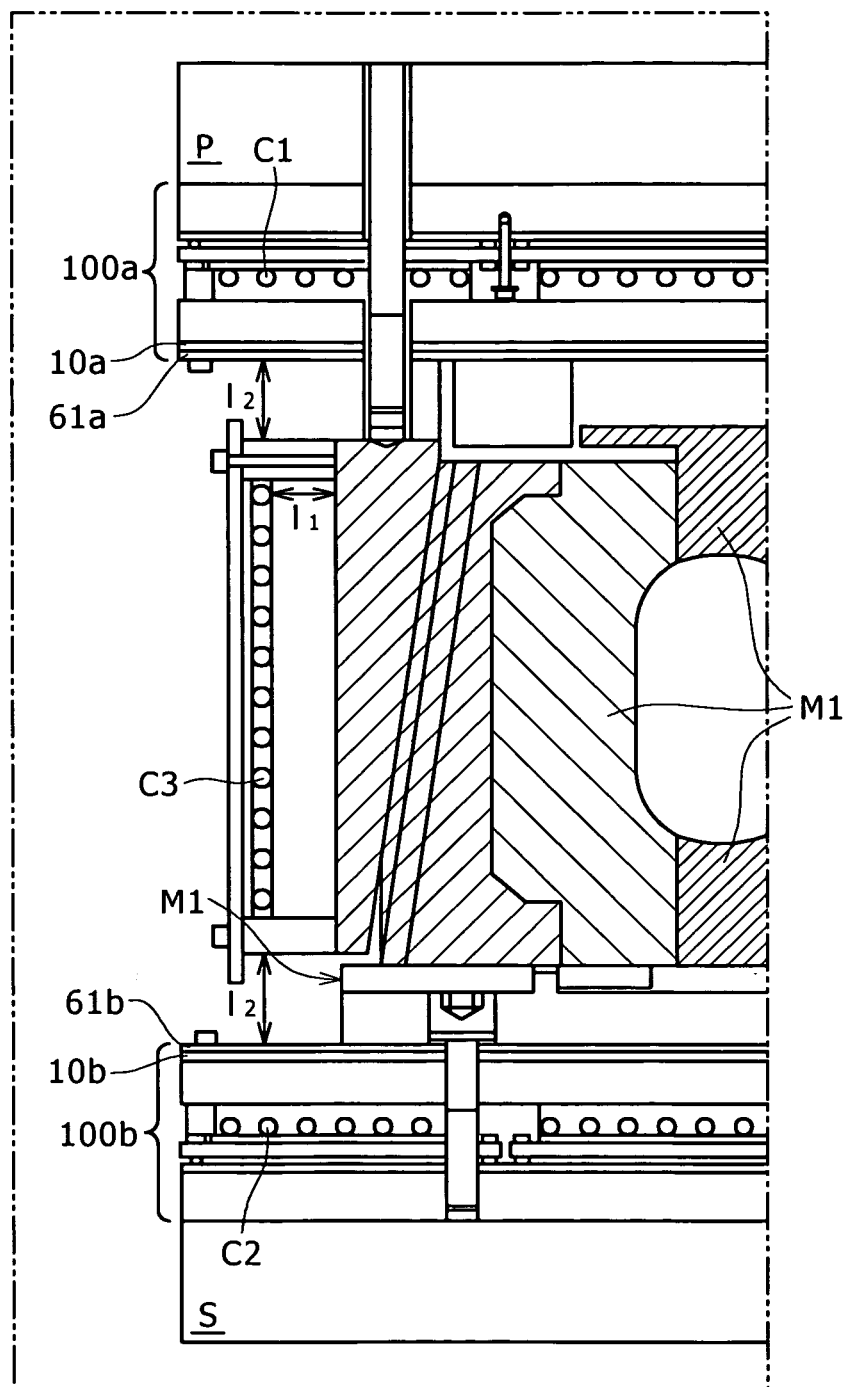
FIG. 5 is an enlarged schematic sectional view of the area G of FIG. 1.

The detail of the tire heating apparatus will be described in reference to FIG. 5. FIG. 5 is an enlarged view of the area G of FIG. 1. The tire mold M1 is heated by the induction heating coil C3. At that time, the magnetic field lines by the induction heating coil C3 which heats from the outer surface side of the tire are generated not only in the direction of the tire mold M1 but also in upper and lower directions. To attenuate the upper or lower magnetic field lines, the distance $l_1$ between the induction heating coil C3 and the tire mold M1 and the distance $l_2$ between the induction heating coil C3 and each of the heating units 100a and 100b are set so as to satisfy the relation of $l_1 < l_2$. According to this, the upper or lower magnetic field lines generated by the induction heating coil C3 are attenuated before they reach the ferromagnetic metallic members 10a and 10b.

A nonmagnetic, highly conductive plate 61a of approximate eddy current penetration thickness is preferably provided in a position close to the induction heating coil C3 on the lower surface side and upper surface side of the heating unit 100a and 100b, respectively. The magnetic field lines which are left without attenuation can be shielded by this nonmagnetic, highly conductive plate. Although eddy current is induced in the nonmagnetic, highly conductive plate, the Joule loss is minimized due to the high conductivity. The above-mentioned copper plate 61a can play also this role. Accordingly, the induction heating coils C1 and C2 and the induction heating coil C3 can be regarded as electromagnetically perfectly independent systems, and the effect by mutual interference of high frequency power sources can be avoided. As the nonmagnetic, highly conductive plate, for example, aluminum or copper can be used.

As stated above, the relative positional relationship among the nonmagnetic conductor 30a, the induction heating coil C1 and the ferromagnetic metallic member 10a can be set by adjusting the first spacers 71a and 72a, the second spacers 21a to 23a and the third spacer 73a. Therefore, the total impedance can be easily adjusted based on the size of the tire mold M1 at low cost without needing the change in turns of the coils or the use of a matching transformer. As a result, an existing power source which supplies a predetermined power, if present, can be used with high power factor by appropriately adjusting the total impedance. Since the nonmagnetic conductor 30a functions as the magnetic shield, the direction of magnetic field lines of the induction heating coil C1 can be regulated to the direction of induction-heating the ferromagnetic metallic member 10a to efficiently heat the tire mold M1 and the tire.

In the heating unit 1, two heating units 100a and 100b are disposed vertically opposite each other across the tire mold M1 for storing a tire, as described above, so that the heating units 100a and 100b heat the tire mold M1 from both the upper and lower sides of the tire mold M1. Thus, the tire mold M1 and the tire can be efficiently heated using the heating units 100a and 100b.

The operation of vulcanization molding by the thus-constituted tire heating apparatus 1 will be described. As the green tire to be vulcanized, a tire including a thick bead part (tire hole peripheral part) and a tread part (road contacting part) formed with metallic bead wire and belt member embedded therein is used. The green tire can be heated from the inside by induction-heating the metallic members.

The upper platen support P is raised by controlling the above-mentioned hydraulic cylinder mechanism to open the tire mold M1, and the green tire before vulcanization is carried into the tire storage part T by a carrying device not shown. A bladder not shown is inserted to the tire hole of the green tire, and the bladder is swollen to hold the green tire with shaping. The upper platen support P is lowered by controlling the hydraulic cylinder mechanism again to close the tire mold M1.

The ferromagnetic metallic members 10a and 10b are induction-heated by supplying power from the power source to the induction heating coils C1 and C2 of the heating units 100a and 100b. The tire mold M1 is heated by transmitting the thermal energy to the tire mold M1 by heat conduction, and the green tire is heated from the outer surface side by the thermal energy transmitted through the tire mold M1. At that time, since the nonmagnetic conductors 30a and 30b, and the ferromagnetic nonconductive members 51a and 52a function as the magnetic shield, the direction of magnetic field lines of the induction heating coils C1 and C2 can be regulated to the direction of induction-heating the ferromagnetic metallic member 10a to efficiently heat the tire mold M1 and the green tire. The induction heating coil C3 to which the power is supplied performs heating of the tire from the outer surface side thereof by applying a strong high frequency magnetic filed to the tire mold. The tire mold M1 is preheated to a desired temperature before the green tire is placed therein, since the tire mold M1 has a large thermal capacity. Further, when continuous batch vulcanization of the green tire is performed, the time for diffusing the heat in the vicinity of the outer surface of the tire mold M1 is ensured by performing boost heating by the heating units 100a and 100b (heating mode for reducing the temperature rise time of the mold by inputting a large power) a bit early to the carrying-in of the green tire into the tire storage part T.

A pressurized medium such as high-temperature, high-pressure steam or nitrogen gas is then supplied into the bladder through a pipe not shown, whereby the bladder is expanded and closely fitted to the inner wall surface of the green tire to press the green tire toward the tire mold M1. The green tire is heated from the inner surface side by transferring the heat quantity of the high-temperature, high-pressure pressurized medium to the green tire through the bladder.

Simultaneously with the above-mentioned operation, supply of power to the induction heating coils C4 to C5 is performed. The induction heating coils C4 and C5 preferentially induction-heat the bead wires provided within the upper and lower bead parts of the green tire by applying strong high frequency to the upper and lower bead parts. According to this, the green tire is entirely heated to a vulcanization temperature in a short time since the heating from the tire inner part is performed in the bead part and tread part having large thicknesses in addition to the heating of the green tire from the outer surface side and inner surface side thereof.

The bladder presses the green tire toward the tire mold M1 to mold the green tire during vulcanization molding of the green tire. In this embodiment, since the bladder is formed of a low-stretchable material having substantially the same shape as a tire inner wall surface shape of vulcanized tire, the tire inner wall surface shape of vulcanized tire can be surely produced, even if the pressure of the pressurized medium is slightly fluctuated. Therefore, when the molding is preformed while pressing the green tire by the bladder, an accurately molded vulcanized tire can be obtained.

After the vulcanized tire is thus obtained, the tire mold M1 is opened by the reverse operation from the above-mentioned operation, the bladder is then contracted, and the vulcanized tire is held and carried out by a carrying-out device. A new green tire is carried in the tire mold to repeat the vulcanization molding. The vulcanization molding of green tire is performed in this manner by the tire heating apparatus 1.

EXAMPLE 1

Results of heating test carried out using the tire heating apparatus 1 are shown. The test was carried out in the following condition. Since the same condition was adapted to the upper and lower heating units 100a and 100b, the description for the lower heating unit is omitted.

(1) Power source: Rated 5 kw (set to maximum output)
(2) Nonmagnetic conductor 30a: aluminum (4 mm in thickness)
(3) Induction heating coil C1: 30 sq Teflon (trademark)-covered litz wire
(4) Distance between induction heating coil C1 and ferromagnetic metallic member 10a: 25 mm (fixed)
(5) Ferromagnetic nonconductive members 51a, 52a: not used The power factor (effectively used power/input power) was calculated by changing the distance L between the induction heating coil C1 and the nonmagnetic conductor 30a by adjusting the first spacers 71a and 72a (and third spacer 73a) while supplying power to the heating unit under the above condition. The test results are as follows (Z represents the total impedance).

(1) L: 40.0 mm, Z: 63.2 µH, Power factor: 25.4%
(2) L: 20.0 mm, Z: 48.3 µH, Power factor: 18.8%
(3) L: 10.0 mm, Z: 36.6 µH, Power factor: 16.6%
(4) L: 5.4 mm, Z: 28.2 µH, Power factor: 15.5%

As a result, since the electric resistance of the nonmagnetic conductor 30a is small, the total impedance of the heating unit 100a was reduced more as the induction heating coil C1 was closer to the nonmagnetic conductor 30a, resulting in a reduced power factor. This is attributable to that the ratio of interrupting the magnetic field lines by the nonmagnetic conductor 30a is increased as the induction heating coil C1 is closer to the nonmagnetic conductor 30a. Thus, the total impedance is changed by adjusting the first spacers 71a and 72a (and the third spacer 73a) to change the distance L, whereby a condition enabling use of the power source with high power factor can be easily adjusted at low cost.

EXAMPLE 2

Results of heating test for the heating unit 100a with or without ferromagnetic nonconductive members 51a and 52a are shown. The condition thereof was set as follows.
(1) Power source: Rated 5 kw (set to maximum output)
(2) Nonmagnetic conductor 30a: aluminum (4 mm in thickness)
(3) Induction heating coil C1: 30 sq Teflon (trademark)-covered litz wire
(4) Distance between induction heating coil C1 and Ferromagnetic metallic member 10a: 21.5 mm (fixed)
(5) Distance between nonmagnetic conductor 30a and induction heating coil C1: 13 mm (fixed)
The test results in the above-mentioned conditions with or without the ferromagnetic nonconductive members 51a and 52a are as follows.
(1) Without ferromagnetic nonconductive members 51a and 52a, Power factor: 15.0%
(2) With ferromagnetic nonconductive members 51a and 52a, Power factor: 33.7%
The power factor in the heating unit 100a with the ferromagnetic nonconductive members 51a and 52a was high with an increased equivalent resistance, compared with the heating unit without the members. The ferromagnetic metallic member 10a could be effectively heated while shielding the magnetic field lines by the ferromagnetic nonconductive members 51a and 52a. Accordingly, the total impedance is changed also by attaching or detaching the ferromagnetic nonconductive members 51a and 52a or increasing or decreasing the quantity thereof, whereby the condition enabling use of the power source with high power factor can be easily adjusted at low cost.

First Modification Example

Figure 6:
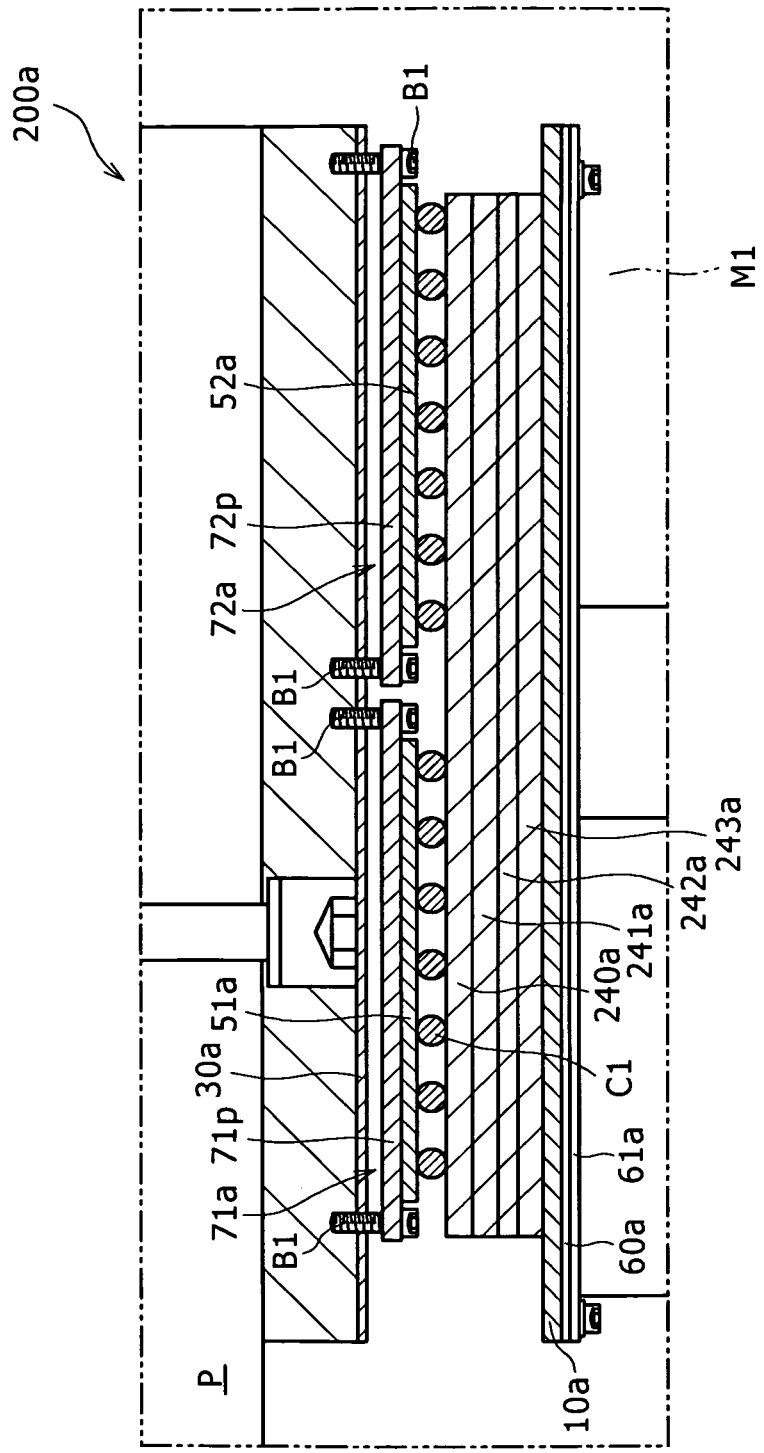
FIG. 6 is a schematic sectional view showing a first modification example of the tire heating apparatus according to the first embodiment of the present invention.

A first modification example of the present embodiment will be described in reference to FIG. 6. A part differed from the above-mentioned embodiment is mainly illustrated, while the same reference number is assigned to the same part as the above-mentioned embodiment to omit the description thereof. The description of the lower heating unit is also omitted similarly to the above-mentioned embodiment. A heating unit 200a of this modification example comprises heat insulating members 240a to 243a disposed in layers instead of the second spacers to support the induction heating coil C1. The heat insulating members 240a to 243a function not only as a heat insulating material but also a spacer for setting a distance between the ferromagnetic metallic member 10a and the induction heating coil C1. In this modification configuration, also, the same effect as the above-mentioned embodiment can be obtained.

Second Modification Example

Figure 7:
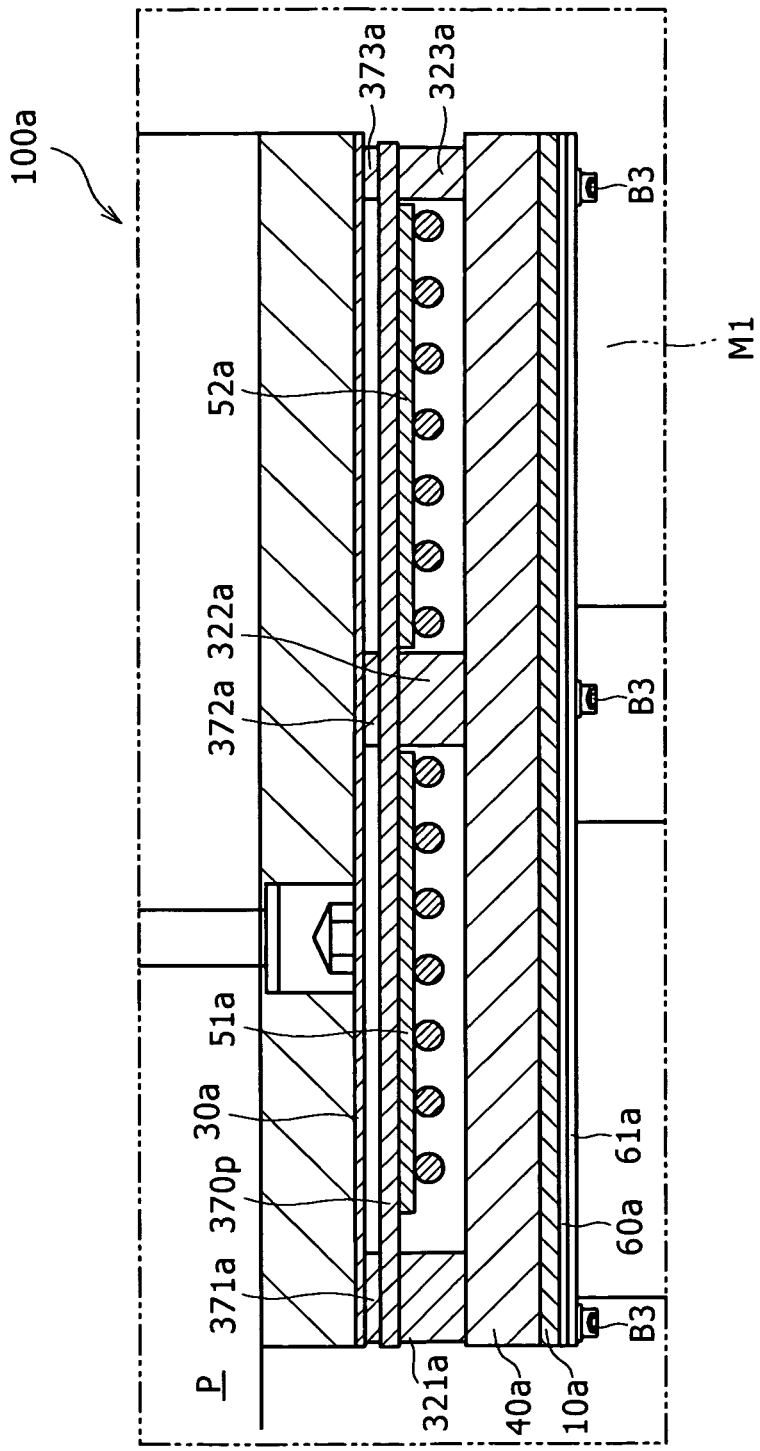
FIG. 7 is a schematic sectional view showing a second modification example of the tire heating apparatus according to the first embodiment of the present invention.

A second modification example of the present embodiment will be described in reference to FIG. 7. A part differed from the above-mentioned embodiment is mainly illustrated, while the same reference number is assigned to the same part as the above-mentioned embodiment to omit the description thereof. The description of the lower heating unit is also omitted similarly to the above-mentioned embodiment. A heating unit 300a of this modification example comprises first spacers 371a to 373a disposed between the nonmagnetic conductor 30a and a spacer plate 370p, and second spacers 321a to 323a disposed between the spacer plate 370p and a heat insulating member 40a, the first spacers 371a to 373a, and the second spacers 321a to 323a being installed by fitting bolts B3 to fitting holes of the nonmagnetic conductor 30a and the upper platen support P through these members. Even if the first spacers and the second spacers are adapted to have this structure, the same effect as in the above-mentioned embodiment can be obtained.

Third Modification Example

Figure 8:
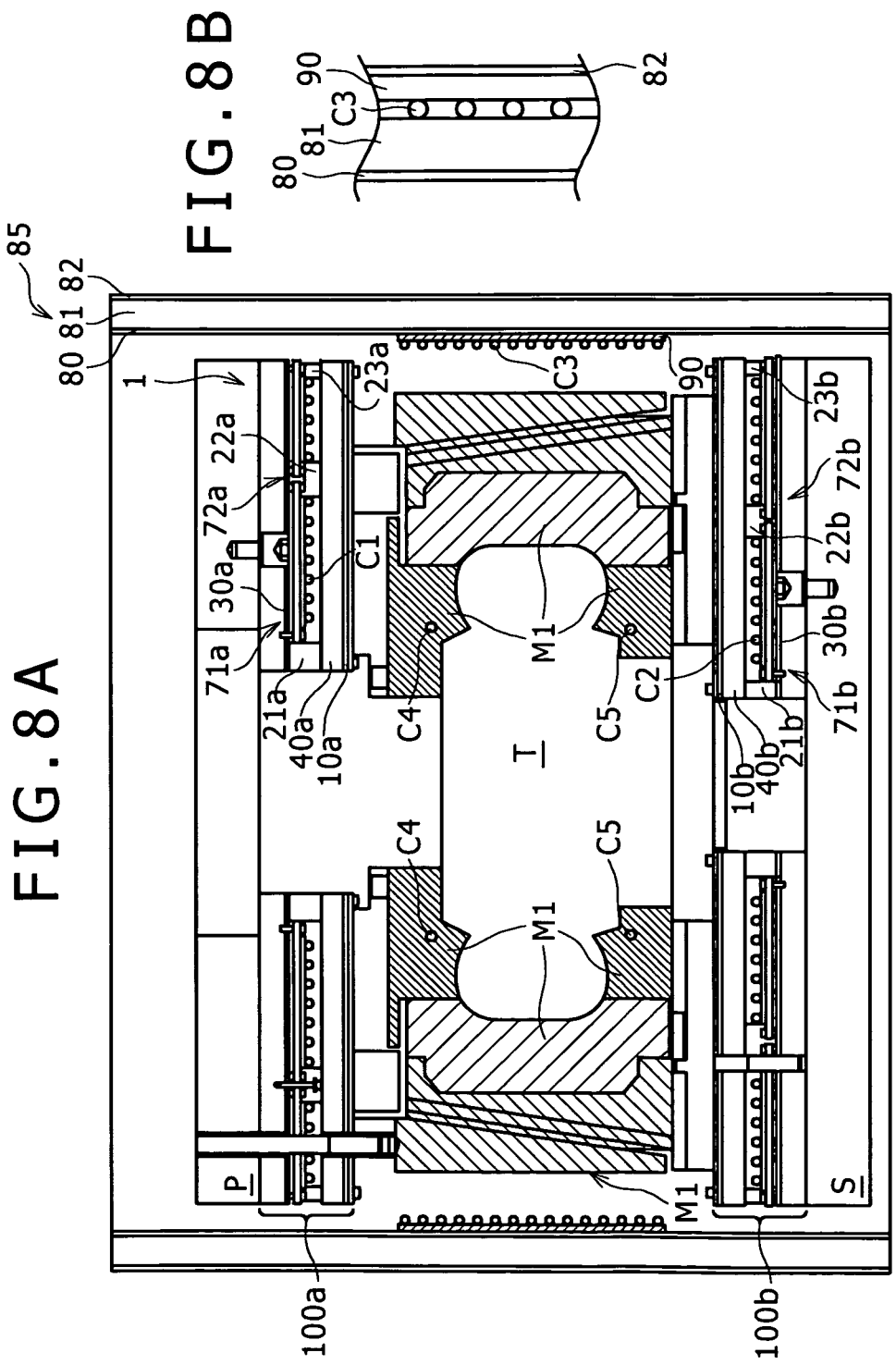
FIG. 8 is a schematic sectional view showing a third modification example of the tire heating apparatus according to the first embodiment of the present invention.

A third modification example of the present embodiment will be described in reference to FIG. 8. A part differed from the above-mentioned embodiment is mainly illustrated, while the same reference number is assigned to the same part as the above-mentioned embodiment to omit the description thereof. In the embodiment shown in FIG. 8(a), the induction heating coil C3 is mounted inside a cylindrical heat shield 85, and a ferromagnetic nonconductive member 90 is provided between the heat shield 85 and the induction heating coil C3. As the ferromagnetic nonconductive member 90, ferrite or the like is used. Since an air layer exists between the induction heating coil C3 and the tire mold M1 as the heated object, overheat of the coil C3 can be prevented. Further, by disposing the ferromagnetic nonconductive member 90, not only the magnetic field lines can be concentrated to the heated object, but also the magnetic field lines turning around to the opposite side can be prevented from reaching a portion not needed to be heated, or to the outside. A nonmetallic member or nonmagnetic metallic member 80 is provided on the inner surface side of the heat shield 85 (when the nonmagnetic metallic member is selected, it is adapted not to electrically form a circuit). Therefore, the Joule loss and the unnecessary overheat resulting from generation of eddy current can be prevented, and the radiation of heat from the heated object can be also suppressed. The radiation of heat from the heated object can be further suppressed by adapting the inner part of the heat shield 85 to be composed of a heat insulating member 81. The magnetic field lines leaked out through the ferromagnetic nonconductive member 90 can be shielded so as not to be further leaked to the outside by disposing a nonmagnetic metallic member 82 on the outer surface side of the heat shield 85. Although eddy current is induced in the nonmagnetic conductive plate, the Joule loss is minimized due to its high conductivity.

FIG. 8(b) shows the other layout form of the nonmetallic member 80, the heat insulating member 81, the nonmagnetic metallic member 82, the ferromagnetic nonconductive member 90 and the induction heating coil C3. In this layout form, the nonmetallic member 80, the heat insulating member 81, the induction heating coil C3, the ferromagnetic nonconductive member 90 and the nonmagnetic metallic member 82 are disposed in this order radially from the inside to the outside. According to this structure, the temperature rise of the coils can be further suppressed.

Fourth Modification Example

Figure 9:
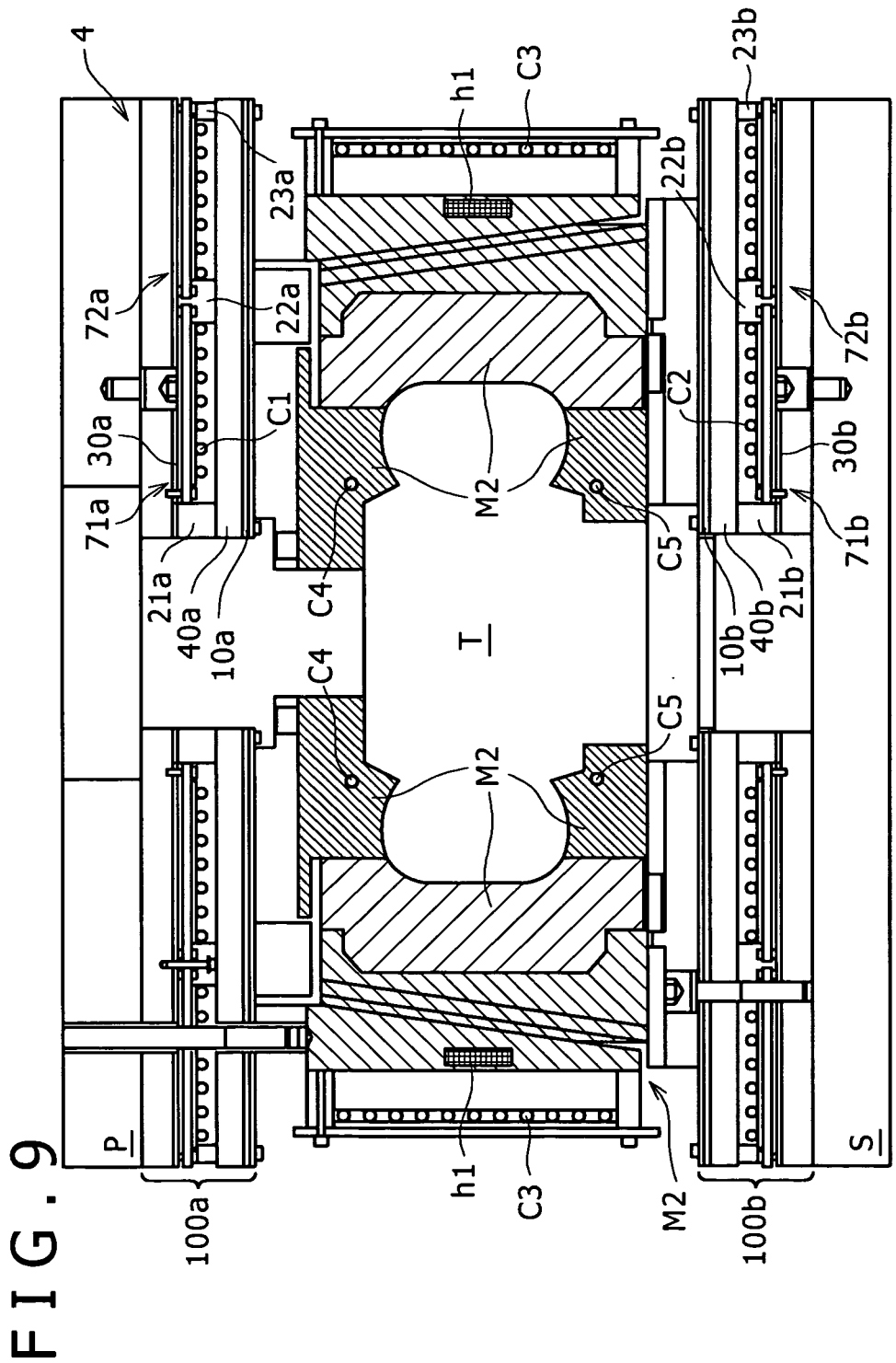
FIG. 9 is a schematic sectional view showing a fourth modification example of the tire heating apparatus according to the first embodiment of the present invention.

A fourth modification example of the present embodiment will be described in reference to FIG. 9. A part differed from the above-mentioned embodiment is mainly illustrated, while the same reference number is assigned to the same part as the above-mentioned embodiment to omit the description thereof. As a tire mold M2 of a tire heating apparatus 4 of this modification example, a mold internally having an annular hole h1 formed to encapsulate heating steam is diverted, with the annular hole h1 being filled with a filling material having high thermal diffusivity. As the filling material having high thermal diffusivity, for example, heat medium oil, silicone oil, liquid metal (gallium, Wood's metal), pressurized water or the like is used. Further, these materials may include solid particles of metal such as aluminum, copper or iron. When a tire is heated by heat conduction of the tire mold M2, heat can be rapidly diffused in the tire mold M2, compared with the case in which the annular hole h1 is filled with air, and the heating efficiency of the tire is improved. A mold having no annular hole h1 may be used by newly forming the annular hole h1 therein, and filling the annular hole with a filling material having thermal diffusivity higher than that of the mold member. In this case, also, heat can be rapidly diffused in the tire mold, compared with the case in which the annular hole h1 is not formed, and the heating efficiency of the tire is improved.

(Second Embodiment)

Figure 10:
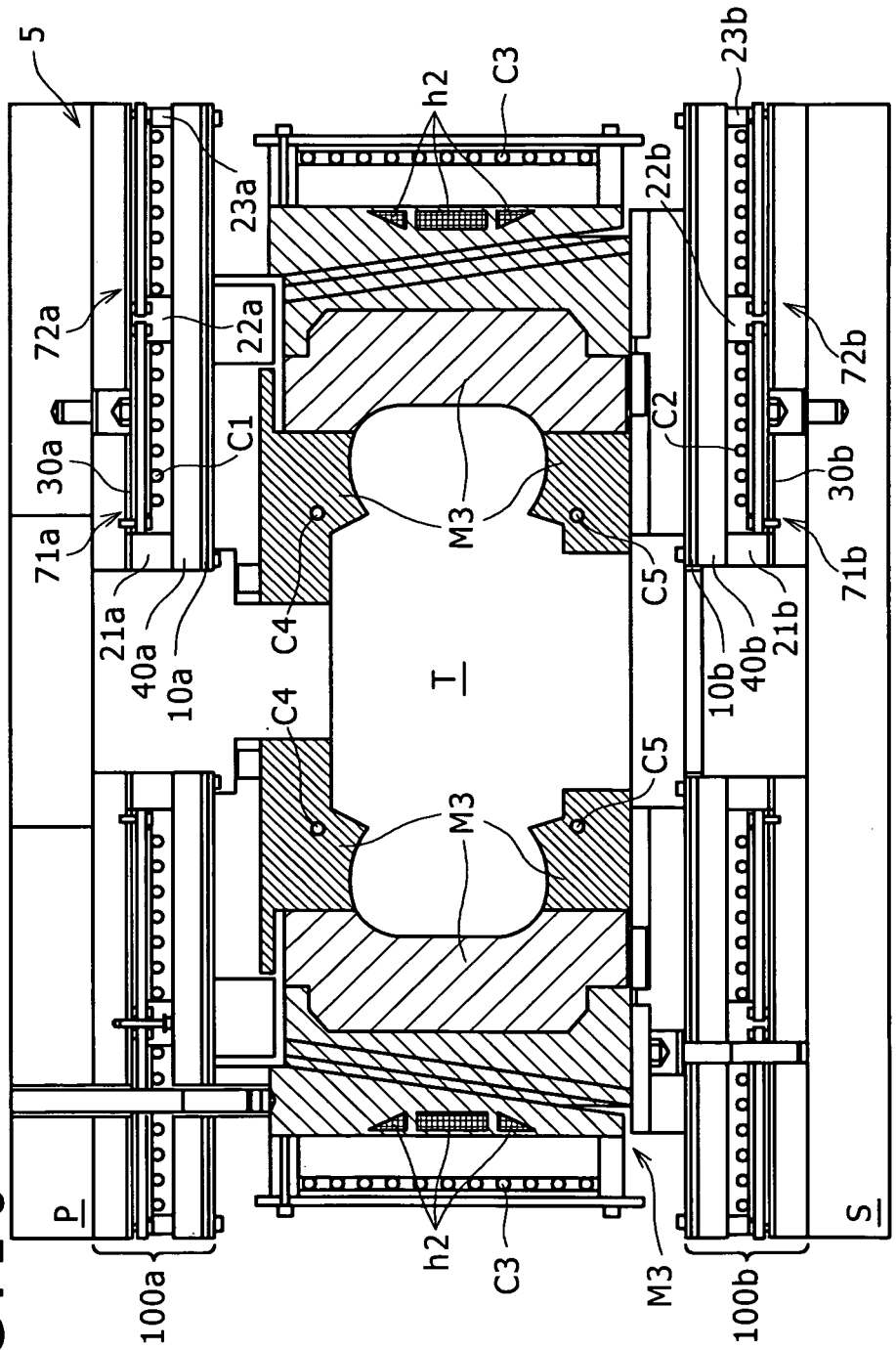
FIG. 10 is a schematic side sectional view of a tire heating apparatus according to a second embodiment of the present invention.

A second embodiment of the present invention will be described in reference to FIG. 10. A part differed from the first embodiment is mainly illustrated, while the same reference number is assigned to the same part as the first embodiment to omit the description thereof. FIG. 10 is a schematic side sectional view of a tire heating apparatus 5 of the second embodiment.

A tire mold M3 of the tire heating apparatus 5 is heated by heating units 100a and 100b in the same manner as in the first embodiment. The tire mold M3 is a tire mold for steam heating, which internally has an annular hole h2 formed to encapsulate high-temperature steam to thereby heat the tire mold M3. In this embodiment, since the tire mold M3 is heated not by steam heating but by induction heating, the annular hole h2 that is a steam flow passage is not used. In this case, if the annular hole h2 which is used as a steam flow passage is left as it is or is filled with air, the annular hole h2 becomes a factor for inhibiting improvement in heating efficiency, since thermal diffusivity of air is smaller than that of metal, and thermal diffusion is consequently inhibited by the part of the annular hole 2h of the tire mold M3. Therefore, in this embodiment, the annular hole h2 is filled with a filling material having high thermal diffusivity.

As the filling material having high thermal diffusivity, heat medium oil, silicone oil, liquid metal (gallium, Wood's metal), pressurized water or the like is used. Further, these materials may include solid particles of metal such as aluminum, copper or iron. According to this, heat can be rapidly diffused in the tire mold M3, compared with the case in which the annular hole h2 is filled with air, and the heating efficiency of tire is improved.

Figure 11:
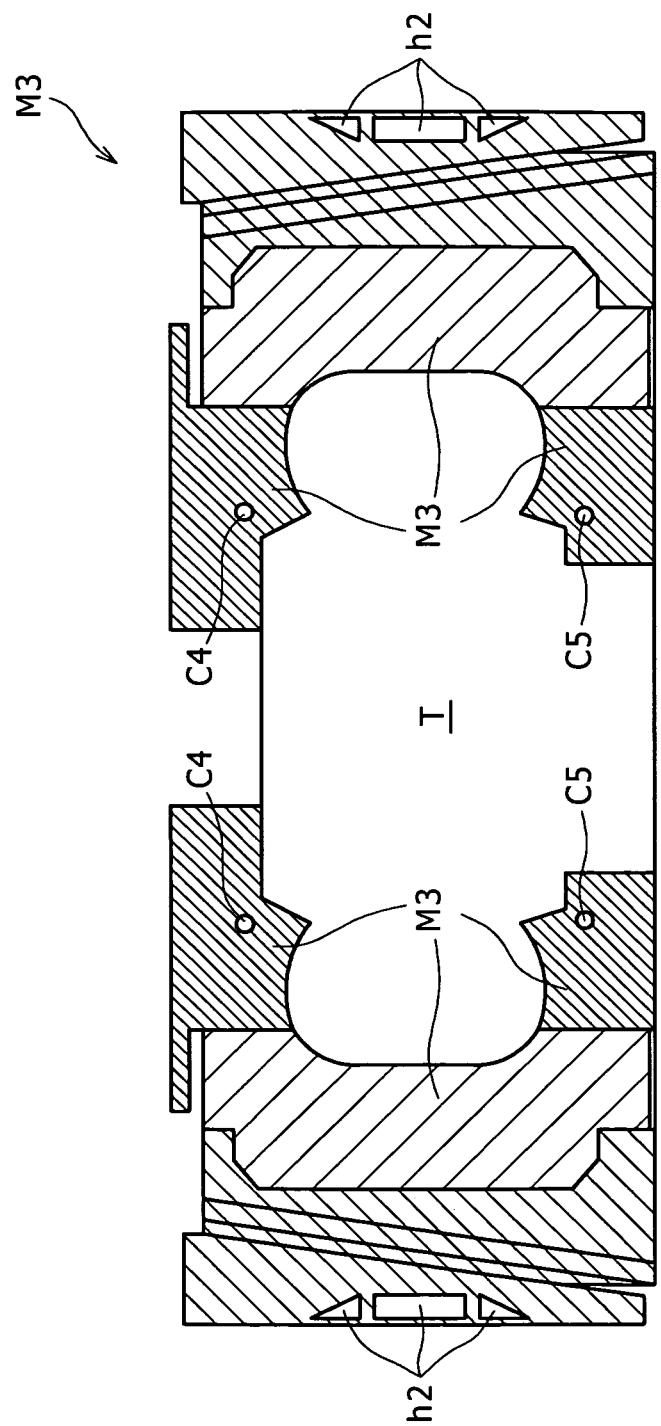
FIG. 11 is a schematic view of the tire mold of FIG. 10, which shows an initial state in a remodeling process.

A method for remodeling the tire mold M3 will be then described. The tire mold M3 can be remodeled by the following process. In an initial state, the heating units 100a and 100b and the like are not installed on the tire mold M3, and the annular hole h2 of the tire mold M3 is filled with only air (FIG. 11).

Figure 12:
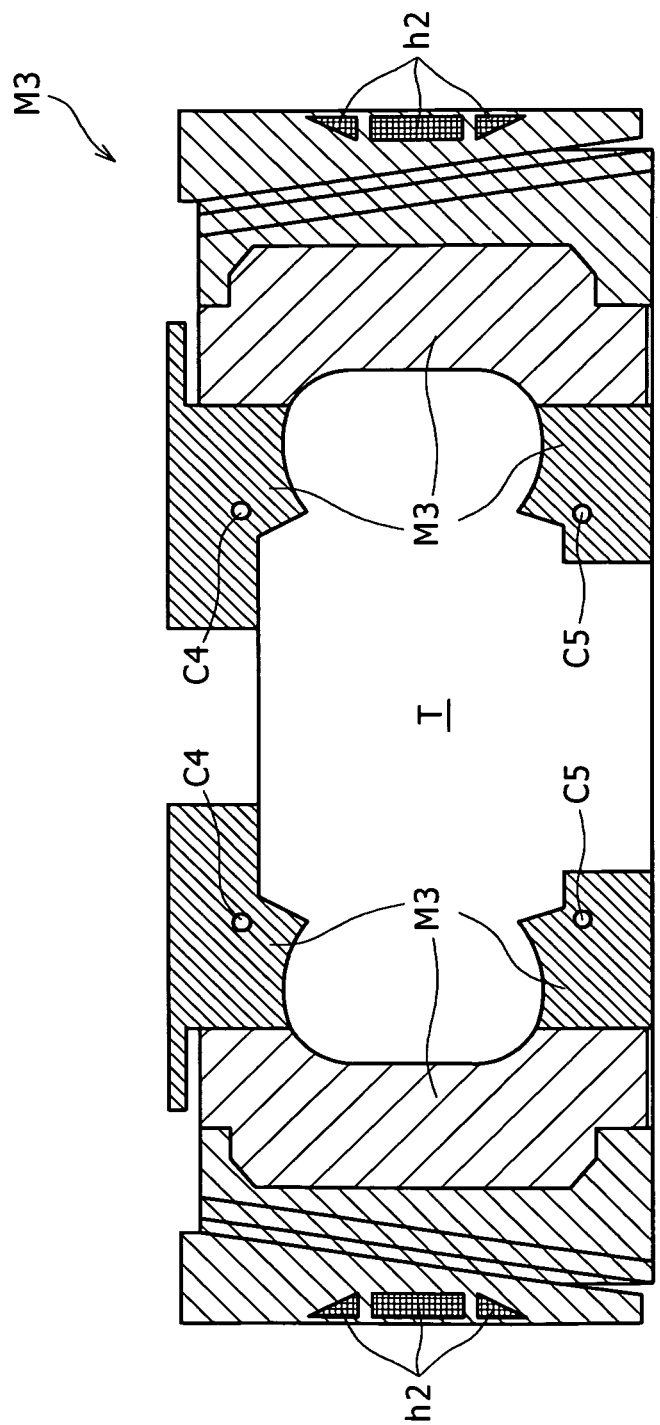
FIG. 12 is a schematic view of the tire mold of FIG. 10, which shows a state where an annular hole is filled with a filling material in the remodeling process.

(1) The annular hole h2 is filled with a filling material having high thermal diffusivity (FIG. 12).

(2) The heating units 100a and 100b for heating the tire mold M3 by heat conduction and the like are installed on the tire mold M3 (FIG. 10).

(3) The tire mold M3 is heated by the heating units 100a and 100b.

When the tire mold M3 for steam heating is diverted, heat can be rapidly diffused in the tire mold M3 by remodeling the tire mold M3 by this method, compared with the case in which the annular hole h2 is filled with air, heat can be rapidly diffused in the tire mold M3, and the tire can be efficiently heated.

First Modification Example

Figure 13:
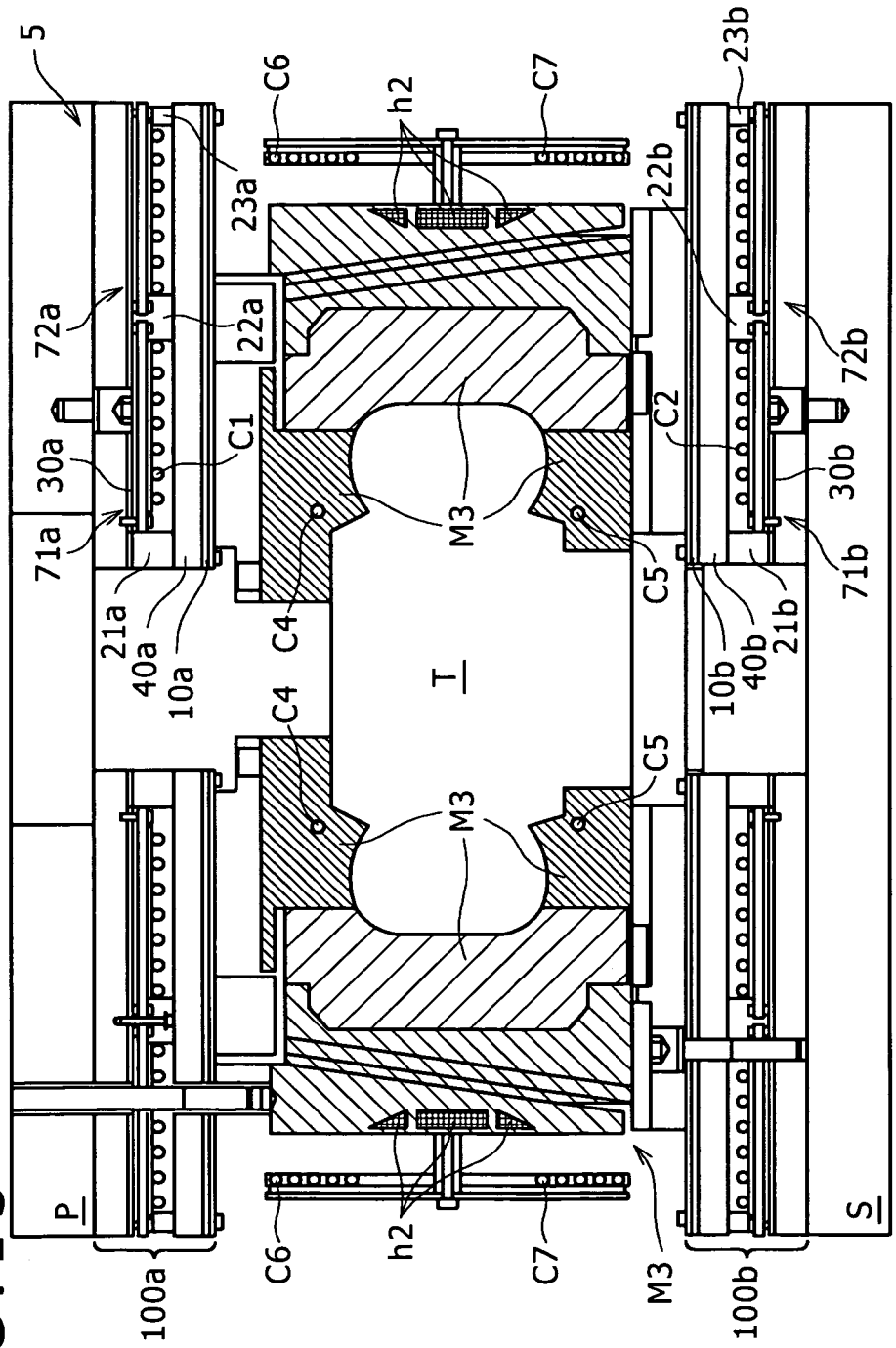
FIG. 13 is a schematic sectional view showing a first modification example of the tire heating apparatus according to the second embodiment of the present invention.

A first modification example of the second embodiment will be described in reference to FIG. 13. A part differed from the above-mentioned embodiment is mainly illustrated, while the same reference number is assigned to the same part as the above-mentioned embodiment to omit the description thereof. In a tire mold M3 of this modification example, an induction heating coil C6 and an induction heating coil C7 are vertically disposed while avoiding an area having the annular hole h2. According to this, the heat can be rapidly transferred without being disturbed by the annular hole h2.

While specific preferred embodiments of the present invention are shown and described, the present invention is never limited by these specific embodiments, and can be carried out with various modifications and substitutions within the scope of the following claims.

In the heating unit, for example, the layout of the first spacer, the second spacer, and the ferromagnetic nonconductive member is not limited by the above-mentioned embodiments, and these members can be closely disposed in a plan view, or the numbers of the members to be disposed can be reduced.

The induction heating coils C3, C4, C5, C6, and C7 can be omitted.

Further, although the vulcanization molding by bladder method is described in the above-mentioned embodiments, the vulcanization molding may be performed by bladderless method. The above-mentioned tire heating apparatus, the heating unit and the tire mold can be used not only for vulcanization molding but also in other tire heating processes.

The spacers are used as the positioning member in the above-mentioned embodiments. The heating unit according to the present invention can be obtained through a simple structure by using the spacers. However, any other means can be used as the positioning means without being limited to the spacers.

While the present invention is described in detail in reference to specific embodiments, it is understood by those skilled in the art that various modifications and corrections may be made in the invention without departing from the sprit and scope thereof. The present application is based on Japanese Patent Application filed Sep. 21, 2006 (No. 2006-255215), and the content thereof is incorporated herein as references.

The invention claimed is:

1. A heating unit for heating a tire mold for storing a tire, comprising:
a ferromagnetic metallic member for heating said tire mold by heat conduction;
an induction heating coil disposed on a side of, and spaced from, said ferromagnetic metallic member opposite said tire mold, said induction heating coil induction-heats said ferromagnetic metallic member by generating magnetic field lines;
a nonmagnetic conductor disposed on a side of said induction heating coil facing opposite said ferromagnetic metallic member, which shields the magnetic field lines generated by said induction heating coil wherein said induction heating coil is disposed between the ferromagnetic metal facing opposite said tire mold and the nonmagnetic conductor; and a positioning unit that adjusts a relative positional relationship among said nonmagnetic conductor, said induction heating coil, and said ferromagnetic metallic member.

2. The heating unit according to claim 1, wherein said heating unit includes, as said positioning unit, a first spacer for setting a distance between said nonmagnetic conductor and said induction heating coil.

3. The heating unit according to claim 1, wherein said heating unit includes, as said positioning unit, a second spacer for setting a distance between said ferromagnetic metallic member and said induction heating coil.

4. The heating unit according to claim 1, wherein said heating unit further includes a heat insulating member provided between said induction heating coil and said ferromagnetic metallic member.

5. The heating unit according to claim 1, wherein said heating unit further includes a ferromagnetic nonconductive member provided between said nonmagnetic conductor and said induction heating coil.

6. The heating unit according to claim 1, wherein said nonmagnetic conductor is aluminum.

7. The heating unit according to claim 1, wherein said ferromagnetic metallic member is a steel-made member having magnetic permeability of 100 to 1000.

8. The heating unit of claim 1, wherein the positioning unit comprises at least one threaded element threadingly engaged with at least one of the nonmagnetic conductor, the induction heating coil, and the ferromagnetic member, wherein, upon rotation of said threaded element, a relative positional relationship is adjusted between at least two of the nonmagnetic conductor, the induction heating coil and the ferromagnetic member.

9. A tire heating apparatus, comprising:
a tire mold for storing a tire; and
two sets of heating units comprising:
  a ferromagnetic metallic member for heating said tire mold by heat conduction;
  an induction heating coil disposed on a side of, and spaced from said ferromagnetic metallic member opposite said tire mold, said induction heating coil induction-heats said ferromagnetic metallic member by generating magnetic field lines;
  a nonmagnetic conductor disposed on a side of said induction heating coil facing opposite said ferromagnetic metallic member, which shields the magnetic field lines generated by said induction heating coil wherein said induction heating coil is disposed between the ferromagnetic metal facing opposite said tire mold and the nonmagnetic conductor; and
  a positioning unit that adjusts a relative positional relationship among said nonmagnetic conductor, said induction heating coil, and said ferromagnetic metallic member,
  wherein at least one of said heating units includes, as said positioning unit has a first spacer for setting a distance between said nonmagnetic conductor and said induction heating coil, or
  wherein at least one of said heating units includes, as said positioning unit has a second spacer for setting a distance between said ferromagnetic metallic member and said induction heating coil, or
  wherein at least one of said heating units further includes a heat insulating member provided between said induction heating coil and said ferromagnetic metallic member, or wherein said heating unit further includes a ferromagnetic nonconductive member provided between said nonmagnetic conductor and said induction heating coil, or wherein said nonmagnetic conductor is aluminum, or wherein said ferromagnetic metallic member is a steel-made member having magnetic permeability of 100 to 1000, which are vertically disposed opposite each other across said tire mold, and wherein
  said two heating units heating said tire mold from both upper side and lower side of said tire mold.

10. The tire heating apparatus of claim 9, wherein the positioning unit compnses at least one threaded element threadingly engaged with at least one of the nonmagnetic conductor, the induction heating coil, and the ferromagnetic member, wherein, upon rotation of said threaded element, a relative positional relationship is adjusted between at least two of the nonmagnetic conductor, said induction heating coil and the ferromagnetic member.

11. A tire heating apparatus, comprising:
a heating unit comprising a ferromagnetic metallic member for heating a tire mold by heat conduction;
an induction heating coil disposed on a side of, and spaced from, said ferromagnetic metallic member opposite said tire mold, which induction-heats said ferromagnetic metallic member by generating magnetic field lines;
a nonmagnetic conductor disposed on a side of said induction heating coil facing opposite said ferromagnetic metallic member, which shields the magnetic field lines generated by said induction heating coil wherein said induction heating coil is disposed between the ferromagnetic metal facing opposite said tire mold and the nonmagnetic conductor; and
a positioning unit that adjusts a relative positional relationship among said nonmagnetic conductor, said induction heating coil, and said ferromagnetic metallic member,
wherein said heating unit includes, as said positioning unit, a first spacer for setting a distance between said nonmagnetic conductor and said induction heating coil, or
wherein said heating unit includes, as said positioning unit, a second spacer for setting a distance between said ferromagnetic metallic member and said induction heating coil, or
wherein said heating unit further includes a heat insulating member provided between said induction heating coil and said ferromagnetic metallic member, or
wherein said heating unit further includes a ferromagnetic nonconductive member provided between said nonmagnetic conductor and said induction heating coil, or
wherein said nonmagnetic conductor is aluminum, or
wherein said ferromagnetic metallic member is a steel-made member having magnetic permeability of 100 to 1000, and
a tire mold composed of a plurality of split segments and having an annular hole internally formed, wherein said annular hole being filled with a filling material having high thermal diffusivity.

12. The tire heating apparatus of claim 11, wherein the positioning unit comprises at least one threaded element threadingly engaged with at least one of the nonmagnetic conductor, the induction heating coil, and the ferromagnetic member, wherein, upon rotation of said threaded element, a relative positional relationship is adjusted between at least two of the nonmagnetic conductor, the induction heating coil and the ferromagnetic member.

* * * * *